United States Patent
Stocchiero

[11] Patent Number: 6,124,055
[45] Date of Patent: Sep. 26, 2000

[54] COVER FOR POLAR ELEMENT FOR THE LID OF A BATTERY

[76] Inventor: Olimpio Stocchiero, Via Kennedy, 5-36050 Montorso Vicentino (VI), Italy

[21] Appl. No.: 09/178,648

[22] Filed: Oct. 26, 1998

[30] Foreign Application Priority Data

Nov. 4, 1997 [IT] Italy ................................ VI9700067

[51] Int. Cl.[7] .............................. H01M 2/34; H01M 2/04
[52] U.S. Cl. .............................................. 429/65; 429/175
[58] Field of Search ............................. 429/65, 121, 175

[56] References Cited

U.S. PATENT DOCUMENTS 3,937,636  2/1976  Slautterback .

FOREIGN PATENT DOCUMENTS 0 306 746  3/1989  European Pat. Off. .
0 798 792  10/1997  European Pat. Off. .
2 442 511  6/1980  France .
94 08 141  7/1994  Germany .

Primary Examiner—John S. Maples
Attorney, Agent, or Firm—Dykema Gossett

[57] ABSTRACT

The invention realizes a cover for polar element (7) which is present on the lid (1) of a battery, on the surface (10) whereof there are at least two poles pieces (2, 3) and a longitudinal relief (4) which is generally parallelepiped and placed opposite the pole pieces. Said cover has a flat surface (71) extending from the relief of the lid as far as covering one of the poles, said flat surface presenting at the bottom bracket-shaped ribs (72, 73) where the vertical side of each bracket has a substantially cylindrical swelling (74, 75) which is suitable for being housed on corresponding hollow cylindrical overhangs (5, 6) which are present on the side of said relief, said overhangs presenting a longitudinal cut (51, 61) which is suitable for the insertion of the bracket flat surface (72, 73).

7 Claims, 2 Drawing Sheets

COVER FOR POLAR ELEMENT FOR THE LID OF A BATTERY

BACKGROUND OF THE INVENTION

The present invention concerns a cover suitable for covering the polar elements which are present on the lid of a battery, especially a starter battery. As it is known starter batteries have on the upper surface a lid presenting two polar pieces, one which is positive and one negative, a series of holes covered with lids which are suitable for the insertion of the electrolyte and are sometimes grouped in a longitudinal relief placed opposite the poles. Both after the first charge and during the batteries storage, it is important that the positive and the negative pole are protected against accidetal contacts with metallic elements which could discharge the battery current and damage the battery itself. Therefore starter batteries are provided with covers which are suitable for protecting the poles so that any possibility of a casual contact and of a discharge is avoided. A kind of known cover is box-shaped, hinged on the longitudinal relief of the lid and can be lifted through a rotation on the hinge which is placed in correspondence with the longitudinal relief. This cover is realized in plastic material and the hinge is realized through a lightening on the plastic material thickness so that it allows the rotation of the movable part on the part which is fixed at the longitudinal relief. Moreover in order to increase the cover safety, some manufactures are provided with a hook, which is protuberance-shaped compared to the cover, cooperating through a release with the edge of the battery lid.

The hinged opening and closing sometimes cause the breaking of this cover. Another trouble results from the application of the covers which are currently on the market on the surface of the longitudinal relief and from the consequent difference in height compared to the other heights of the lid. This makes the batteries piling-up difficult.

BRIEF SUMMARY OF THE INVENTION

The aim of the present invention is that of realizing a poles cover overcoming the above-mentioned troubles.

In fact it is wanted to realize a cover for the positive and negative polar element which can keep, after its positioning, on the same plane formed by the longitudinal parallelepiped relief which is present on the battery lid. The result is a single face improving the battery aesthetically as well as a large surface making the batteries piling-up easier.

It is also wanted to avoid the hinged connection for lifting or removing the cover from the lid of the battery, so that brekings after repeated moves are avoided.

All the above-mentioned aims and other which will be better underlined later on are achieved by a cover for any polar element which is present on the lid of a battery on the surface whereof there are at least two poles pieces and a longitudinal relief which is generally parallelepiped and placed opposite the pole pieces which, according to the content of the first claim, is wherein it has a flat surface extending from the relief of the lid as far as covering one of the poles, said flat surface presenting at the bottom bracket-shaped ribs where the vertical side of each bracket has a substantially cylindrical swelling which is suitable for being housed on corresponding hollow cylindrical overhangs which are present on the side of said relief, said overhangs presenting a longitudinal cut which is suitable for the insertion of the bracket flat surface.

A distinctive feature of the invention cover is that the plane surface is at the same height compared to the surface of the most projecting parts of the lid, realizing therefore a single useful face between the lid and the cover for the batteries piling-up.

Further features and peculiarities of the invention will be better underlined in the description of a preferred embodiment of the invention which is given appoximately but not restrictively and is illustrated in the enclosed drawings where:

DETAILED DESCRIPTION OF THE INVENTION

Figure 1:
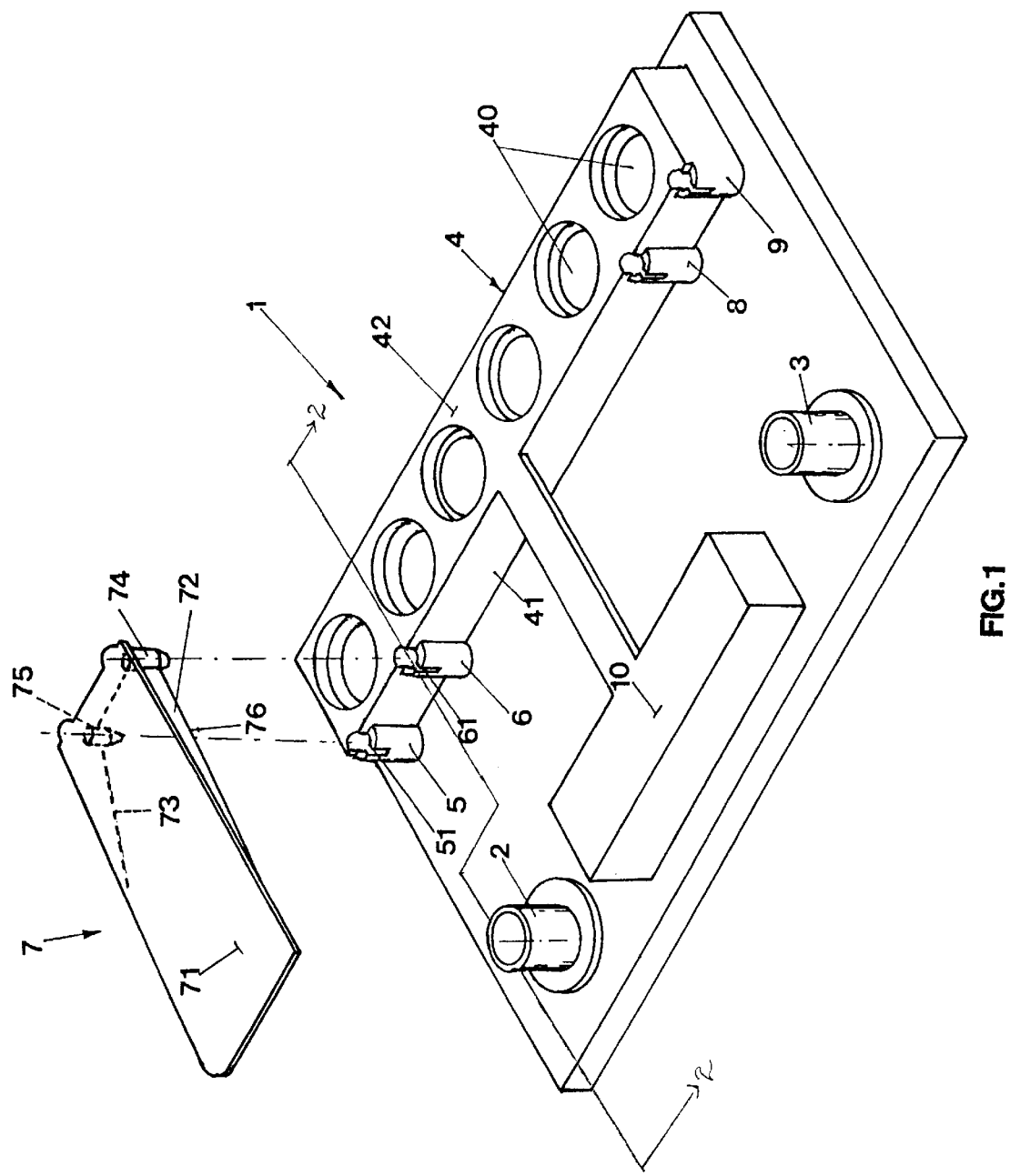
FIG. 1 shows in a perspesctive view the cover of the invention ready for being applied on a battery lid.
Figure 2:
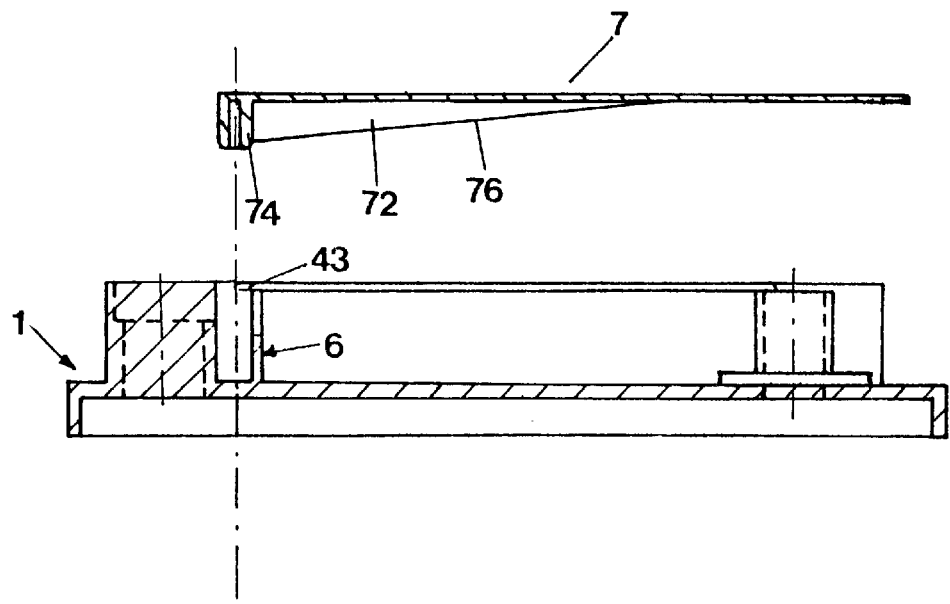
FIG. 2 shows a section of the invention before the connection with the battery lid; taken along line 2—2 in FIG. 1.
Figure 3:
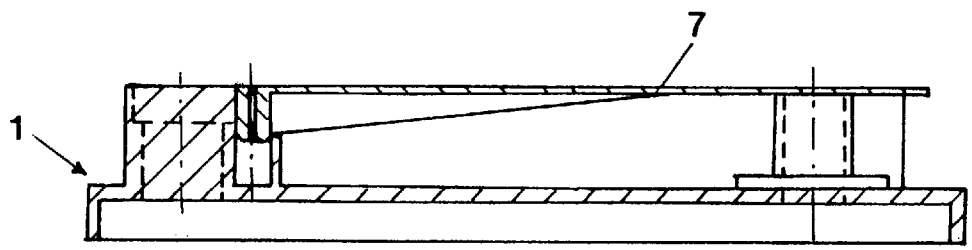
FIG. 3 shows again a section of the battery cover according to the invention after having been inserted in the lid.

Referring to FIG. 1 the battery lid 1 on the surface whereof there are a positive pole 2 and a negative pole 3 can be observed. On the opposite side, always on the surface 10 of the lid 1, there is a longitudinal relief 4 on which are assembled the holes 40 for the insertion of the electrolyte in every cell of the battery. On the lateral wall 41 of the longitudinal relief 4 and opposite the positive pole, ther are two cylindrical hollow overhangs 5 and 6 which are placed vertically. Said cylindrical hollow overhangs 5 and 6 have a longitudinal cut 51 and 61 respectively which will be shown to be useful for the insertion of the bracket in the covering element. The cover, marked with 7 as a whole, presents a flat surface 71 and two bracket-shaped ribs 72 and 73, each one presenting on the vertical side 74 and 75 respectively a thickness swelling, compared to the thickness of each bracket 72 and 73. Such thickness swellings are plug-compatible with the holes which are present on the cylindrical hollow overhangs 5 and 6. Therefore it is evident, as besides it can be observed in FIG. 3, that the vertical side 74 can be housed in the overhang 6 since the squint side 76 can come out of the overhang 5 because of the presence of the longitudinal cut 51. The same can be said for the bracket 73. Through such a solution and keeping the cylindrical hollow overhangs 5 and 6 slightly lower compared to the top of the longitudinal relief surface 4, as it can be observed in FIG. 2 where the lowering is marked with 43, the surface 71 can be kept at the same height compared to the surface 42 of the longitudinal relief 4. Likewise, an identical cover 7 can be placed in the cylindrical hollow overhangs 8 and 9 which are placed opposite the pole 3. Through the two covers 7 which are placed above the pole 2 and above the pole 3, a face formed by the surface 42 and the surfaces 71 and 10 can therefore be obtained. In the case of the example, the thick and sufficiently rigid face can assure the piling-up of several batteries without any problem and improves aesthetically the battery. In order to lift or remove the cover 7 it is sufficient to extract by hand said cover from the cylindrical hollow overhangs 5 and 6 housing the ribs 74 and 75.

As it can be observed all the aims of the invention have been achieved and especially that of avoiding possible breakings on hinges or other opening and closing devices of the cover. The aim of realizing an effective face for the piling-up of the batteries has been achieved too.

What is claimed is:

1. A Cover for polar elements present on a lid of a battery, on a surface whereof there are at least two pole pieces and a longitudinal relief which is generally parallelepiped and placed opposite the pole pieces, wherein the cover has a cover flat surface extending from the relief for covering a corresponding one of the poles pieces, said cover flat surface having bracket-shaped ribs with vertical sides, each rib having a rib flat surface and a substantially cylindrical swelling for being housed on corresponding hollow cylindrical overhangs on a side of said relief, said overhangs each having a longitudinal cut for the insertion of the rib flat surface.

2. A Cover according to claim 1, wherein the cylindrical overhangs on which said cover has an upper portion which is lowered relative to the plane of the parallelepiped relief so that when inserted therein, an upper surface of said cover is coplanar with an upper surface of the relief part of the lid.

3. A cover for polar elements on a lid of a battery, wherein at least two pole pieces extend from a surface thereof, and a longitudinal, generally parallelepiped relief formed in the lid, and spaced apart posts having cylindrical openings and longitudinal cuts are formed in the relief on a side of the relief located opposite the pole pieces, the cover comprising a cover flat surface extending from an upper surface of the relief and covering a corresponding one of the poles, said cover flat surface having depending bracket-shaped ribs extending from a lower surface including spaced apart rib flat surfaces and substantially cylindrical end portions having the same spacing as the openings and the cuts, said cylindrical end portions suitable for engaging the corresponding hollow cylindrical openings and, said longitudinal cuts for receiving the rib flat surfaces.

4. A cover according to claim 3, wherein the posts have an upper margin relative to the upper surface of the relief so that an upper surface of said cover is on the same plane formed by the upper surface of the relief.

5. A cover according to claim 3, wherein the cover further includes a depending wall joining the cylindrical end portions of the ribs.

6. A cover according to claim 3, wherein the cover is coplanar with the relief.

7. A cover according to claim 3, wherein end portions are formed in a margin of the cover and said end portions conform with the openings in the posts.

* * * * *